(12) United States Patent
Moore

(10) Patent No.: US 6,464,429 B2
(45) Date of Patent: Oct. 15, 2002

(54) ARTIFICIAL REEF MODULE FOR CORAL REEF REMEDIATION

(76) Inventor: Michael D. Moore, 306 Chattanooga St., San Francisco, CA (US) 94114

( * ) Notice: Subject to any disclaimer, the term of this patent is extended or adjusted under 35 U.S.C. 154(b) by 0 days.

(21) Appl. No.: 09/792,261

(22) Filed: Feb. 23, 2001

(65) Prior Publication Data

US 2002/0119006 A1 Aug. 29, 2002

(51) Int. Cl.⁷ ................................................. E02B 3/04
(52) U.S. Cl. ............................. 405/24; 405/25; 405/29; 405/33
(58) Field of Search .............................. 405/21, 24, 25, 405/29, 30, 33

(56) References Cited

U.S. PATENT DOCUMENTS

| | | | | |
|---|---|---|---|---|
| 2,387,355 A | * | 10/1945 | Rehfeld | 405/29 |
| 2,669,844 A | * | 2/1954 | Rehfeld | 405/29 |
| 2,803,113 A | * | 8/1957 | Hoad | 405/29 |
| 3,105,457 A | * | 10/1963 | Krueger | 116/63 P |
| 3,252,287 A | * | 5/1966 | Suzuki | 273/160 |
| 3,380,253 A | * | 4/1968 | Vita | 405/29 |
| 3,399,535 A | * | 9/1968 | O'Neill | 405/29 |
| 3,517,912 A | * | 6/1970 | Foley | 256/1 |
| 3,561,402 A | | 2/1971 | Ishida | 119/3 |
| 3,824,956 A | | 7/1974 | Presley | 119/3 |
| 3,888,209 A | | 6/1975 | Boots | 119/1 |
| 3,898,958 A | | 8/1975 | Pranis, Jr. | 119/3 |
| 3,901,190 A | | 8/1975 | Wiegardt, Jr. | 119/4 |
| 3,996,894 A | | 12/1976 | Wiegardt, Jr. | 119/4 |
| 3,996,895 A | | 12/1976 | Wiegardt, Jr. | 119/4 |
| 4,130,994 A | | 12/1978 | Van Moss, Jr. | 405/24 |
| 4,196,694 A | | 4/1980 | Buchanan | 119/3 |
| 4,316,431 A | | 2/1982 | Kimura | 119/3 |
| 4,334,499 A | | 6/1982 | Baass | 119/3 |
| 4,388,019 A | | 6/1983 | Kajihara | 405/25 |
| 4,439,059 A | | 3/1984 | Kikuzawa et al. | 405/25 |
| 4,441,453 A | | 4/1984 | McMickle et al. | 119/3 |
| 4,465,399 A | | 8/1984 | Kikuzawa et al. | 405/32 |
| 4,508,057 A | | 4/1985 | Suzuki | 119/3 |
| 4,767,235 A | | 8/1988 | Caradonna et al. | 405/33 |
| 4,840,516 A | | 6/1989 | Rambo | 405/33 |
| 4,913,094 A | | 4/1990 | Jones et al. | 119/3 |
| 4,913,595 A | | 4/1990 | Creter, Jr. et al. | 405/30 |
| 4,947,791 A | | 8/1990 | Laier et al. | 119/3 |
| 4,997,311 A | | 3/1991 | Van Doren | 405/30 |
| 5,007,377 A | | 4/1991 | Muench, Jr. | 119/4 |
| 5,071,285 A | | 12/1991 | Van Doren | 405/25 |
| 5,113,792 A | | 5/1992 | Jones | 119/3 |
| 5,173,006 A | | 12/1992 | Lowe | 405/25 |
| 5,190,403 A | * | 3/1993 | Atkinson | 405/21 |
| 5,199,377 A | | 4/1993 | Gehrmann, III et al. | 119/4 |
| 5,207,531 A | | 5/1993 | Ross | 405/79 |
| 5,213,058 A | | 5/1993 | Parker et al. | 119/2 |
| 5,215,406 A | | 6/1993 | Hudson | 405/25 |
| 5,238,325 A | | 8/1993 | Krenzler | 405/21 |
| 5,259,695 A | | 11/1993 | Mostkoff | 405/29 |
| 5,269,254 A | | 12/1993 | Gagliano et al. | 119/237 |
| 5,275,125 A | | 1/1994 | Rotramel | 119/15 |
| 5,370,476 A | | 12/1994 | Streichenberger | 405/25 |
| 5,427,472 A | * | 6/1995 | Ono | 405/21 |
| 5,454,665 A | | 10/1995 | Hughes, Sr. | 405/24 |
| 5,501,546 A | * | 3/1996 | Dorrell | 405/25 |
| 5,507,594 A | | 4/1996 | Speicher | 405/25 |
| 5,526,763 A | | 6/1996 | Liaw | 114/264 |
| 5,543,034 A | | 8/1996 | Hilbertz et al. | 205/688 |
| 5,564,369 A | | 10/1996 | Barber et al. | 119/221 |
| 5,639,657 A | | 6/1997 | Saiki et al. | 435/410 |
| 5,823,710 A | * | 10/1998 | Dooley | 405/15 |
| D424,703 S | * | 5/2000 | Salls | D25/58 |

* cited by examiner

Primary Examiner—Gary S. Hartmann
(74) Attorney, Agent, or Firm—Gary L. Eastman

(57) ABSTRACT

The artificial reef module for coral reef remediation of the present invention includes a central body having an upper settling plate, a middle settling plate, and a lower settling plate. Extending from the central body is a plurality of primary tines which further include a plurality of secondary tines extending from them. The primary tines include the supporting tines, the stabilizing tines, and the space filling tines. The branching of the tines closely replicates the appearance of natural branching coral. Over time the individual artificial reef modules for coral reef remediation would slowly degrade and allow the tines to break off. This degradation closely approximates the fragmentation that occurs with natural branching coral.

25 Claims, 16 Drawing Sheets

ARTIFICIAL REEF MODULE FOR CORAL REEF REMEDIATION

FIELD OF THE INVENTION

The present invention relates generally to underwater structures. More specifically, the present invention pertains to artificial reef structures. The present invention is particularly, though not exclusively, useful as an artificial, non-permanent reef structure that can be placed underwater in tropical marine environments to promote the settlement and growth of benthic invertebrates, to provide shelter and protection for schools of small reef fish, and ultimately, to promote the re-growth of damaged coral and the growth of new coral.

BACKGROUND OF THE INVENTION

Coral reefs are extremely complex marine ecosystems which are home to numerous aquatic species. Coral reefs are thought by many scientists to be the most biologically diverse, species-rich and productive ecosystems on the earth. Coral reefs occupy approximately two-tenths of a percent (0.2%) of the world's ocean surfaces. However, it is estimated that coral reefs are home to nearly a million marine species, including a quarter of all fish species.

Corals are divided into two types: hard corals and soft corals. Hard corals, such as staghorn, elkhorn, and pillar corals, are stationary on the ocean floor and have rigid exoskeletons, or corallites, that protect the soft delicate bodies within their interior. Soft corals, or gorgonians, such as sea fans, sea whips, and sea rods, are also stationary on the ocean floor, but they lack an exoskeleton. The soft corals sway back and forth under the influence of the currents.

Coral reefs provide several important benefits to the world's population. These benefits include tourism, private and commercial fishing, mainland and island protection, medicines, and ecological indications. Many people travel to coral reefs to snorkel, scuba-dive, and fish. For example, many island countries in the Pacific and Indian Oceans and in the Caribbean Sea derive a substantial portion or their income from the tourism attracted by the nearby coral reefs.

As previously mentioned, numerous types of fish find shelter in coral reefs and use them for spawning, feeding and nursing. Therefore, substantial income and employment may also be derived from commercial fisheries operating near coral reefs. Moreover, in poorer countries, many of the inhabitants reside within the coastal zones of developing regions and rely directly on fish caught at the nearby coral reefs for their necessary protein.

Coral reefs provide protection from coastal damage from intense wave action, such as coastal erosion and flooding. Older reefs have facilitated the formation of lagoons and calm shorelines where seagrass beds and mangrove trees flourish to provide shelter and habitat for numerous species at the coastal/aquatic interface.

Coral reefs are also a source of many important pharmaceutical breakthroughs. It is estimated that nearly one-half (½) of the potential pharmaceuticals presently being explored are from the oceans—many of which are found near coral reefs.

Finally, because of their susceptibility to minor temperature variations, coral reefs may provide indication of ecological changes much quicker than other ecosystems. For example, coral reefs may be among the first ecosystems to show signs of ecological stress from global warming and as such, coral reefs are very important ecologic indicators.

Unfortunately, many of the earth's coral reefs are in danger of being severely injured or destroyed by human activity. Water pollution, global warming and direct physical contact from boat anchors, divers, etc., are among many of the causes of this deterioration. Moreover, the spread of non-sustainable fishing methods, such as dynamite fishing, have caused a rapid decline in the live coral cover on many of the world's coral reefs.

As a result, many large reef tracts have been reduced to little more than vast fields of coral rubble. Because of the lack of a suitable habitat, reef fish, particularly the juveniles and the small herbivorous species, will quickly abandon a demolished reef. Young hard corals struggling for a foothold on the ocean floor may be easily smothered by carpets of algae, aggressive soft corals, and shifting reef sediment. Furthermore, without the successful recruitment of hard corals or fish to the coral reef, collapse of the ecosystem rapidly ensues. Under these circumstances, many decades are required to completely re-establish a highly diverse hard coral cover and propagate normal reef fish populations.

Hard corals may reproduce sexually or asexually. Sexual reproduction of coral involves spawning, fertilization and the production of planula larvae, some of which may live in plankton for up to one hundred (100) days. Asexual reproduction may include the budding of polyps from a parent colony, polyp bailout, or fragmentation. Polyp bailout occurs when a polyp abandons a corallite and re-establishes itself on a new substratum. Fragmentation is common with branching forms of coral and is a process by which new colonies may be initiated when a patent colony is broken up during a storm.

The growth of hard coral depends on its structure. Branching forms of hard coral, such as staghorn or Acropora, which grow linearly, grow at a rate between one hundred and two hundred millimeters per year (100–200 mm/yr). Massive colonies with dense skeletons, however, grow at a rate between six and twelve millimeters per year (6–12 mm/yr), but these colonies may live for centuries.

A thriving hard coral reef depends on the presence of mutually dependent organisms and the maintenance of the microhabitats that they require. One fundamental relationship for a thriving hard coral reef is the relationship between the coral and the small herbivorous reef fish. Overlapping and interlocking coral branches and coral plates create a complex, three-dimensional habitat having a multitude of intersticial spaces suitable for housing large populations of small reef fish. The different small, herbivorous fish species keep the corals free of rapidly growing algae that would otherwise quickly overwhelm and kill the corals.

The intersticial spaces created by the coral branches and plates also provide shelter for juvenile members of larger reef fish species and protect them from predators during their early growth years. Without the protection afforded by hard corals, populations of economically important reef fish would quickly decline.

Another fundamental relationship for a thriving hard coral is that which exists between established hard coral colonies and planktonic coral larvae in the water column seeking an appropriate place to settle and grow. On a healthy coral reef, lush hard coral growth stabilizes reef sediments by depositing a thick accumulation of broken coral branches and plates upon which the living corals grow. The upper part of this accumulation forms an open framework characterized by abundant shaded surfaces which are elevated above the level of shifting sediments.

Coral larvae prefer to settle in this microhabitat, and they tend to seek out the shaded undersides of the coral framework where they are protected from algae, grazing invertebrates and accumulating sediments. On a coral reef that has suffered extensive physical damage, this microhabitat is eliminated, and the recruitment of hard corals to the reef slows because coral larvae have great difficulty establishing in open, unprotected areas of sand, loose rubble, or rubble covered with carpets of algae and aggressive soft corals. This is the principal reason for the long recovery time of damaged coral reefs.

Artificial reefs have been explored as a means of speeding the recovery of damaged coral reefs. For example, U.S. Pat. No. 5,639,657, which issued in 1997 to Saiki et al. for an invention entitled "Process For Formation Of Artificial Seaweed Bed" (the "'657 patent") discloses an artificial reef system which is coated with a porous glassy material.

This glassy material contains silicon, ferrous iron, phosphorus, manganese, sodium and/or potassium. The glassy material will slowly dissolve in seawater releasing the component minerals. The dissolution of the glassy material depends on the porosity of the glassy material and the composition of the mineral components. The '657 patent discloses a structure which is coated with the glassy material and submerged to form an artificial reef. Over time the glassy material will dissolve, and when the glassy material is fully dissolved the underlying structure will remain intact.

U.S. Pat. No. 5,564,369, which issued in 1996 to Barber et al. for an invention entitled "Reef Ball" (the "'369 patent"), discloses a hollow, spherical reef module made from concrete. The outer wall of the reef module disclosed by the '369 patent includes a plurality of different sized and different shaped holes leading to the interior space. The modules may be cast on shore around an inflatable bladder, dragged to the desired location, and submerged to the ocean floor by deflating the bladder.

U.S. Pat. Nos. 4,913,094, and 5,113,792, which issued in 1990 and 1992 to Jones et al. for inventions entitled "Artificial Reef System" (the "'094 patent") and "Artificial Reef Module" (the "'792 patent"), discloses a rectangular column composed of corrugated sheets which may be oriented horizontally or vertically.

The '094 patent and the '792 patent each include a heavy base which is attached to the column. This base is designed to hold the column on the ocean floor. Additionally, the '094 patent and the '792 patent are designed to remain intact. It is expected that over time microbial attachment, biofouling, and sedimentation will become completely sufficient to hide either the '094 patent or the '792 patent from view. This will create the appearance of a natural reef system.

U.S. Pat. No. 5,215,406, which issued in 1993 to Hudson for an invention entitled "Artificial Ocean Reef Module And Method of Module Construction" (the "'406 patent"), discloses a heavy dome-like structure with man-made irregularities similar to naturally occurring reefs. The device of the '406 patent is designed to last indefinitely. U.S. Pat. No. 3,898,958, which issued in 1975 to Pranis, Jr. for an invention entitled "Open Water Fish Farming Apparatus" (the "'958 patent"), discloses a lattice composed of individual cubes. The framework of the cubes includes different sized openings to facilitate the sheltering of a variety of fish. The lattice is designed to be assembled on shore and then transported by boat to a location where it is submerged. The lattice is easily expandable and designed to last indefinitely.

Each of the above-mentioned artificial reefs is a permanent underwater structure designed to attract fish. There are also numerous other types of artificial reefs made from discarded pollutants such as tires, concrete blocks, wrecked cars, and sunken ships also designed to attract fish and aid in the remediation of damaged reefs. However, there is a growing consensus that these artificial reefs are generally ineffective.

It is widely held that artificial reef structures like the ones discussed above are poorly suited for the remediation of damage coral reefs, particularly in developing countries. In these regions, where vast areas of coral reefs have been severely damaged, there is an acute need to replenish reef fisheries in the face of sustained, intense fishing pressure. Moreover, there is a growing demand on the part of ecotourism operators and conservation agencies for the remediation of coral reefs to pristine condition.

Because of their cost and difficult installation, conventional artificial reefs typically end up covering such a small area of the reef that they fail to make a significant impact on the reproduction rates of hard corals and reef fish. Furthermore, conventional artificial reefs, such as the "Reef Ball" disclosed by the '369 patent, tend to attract and shelter adult fish, allowing important brood stocks to be easily fished out. They also fail to provide the complex, fine-scale habitat needed by juvenile fish or small herbivorous fish. Each of these artificial reefs is made from materials, such as metals, plastics and concrete, which are often chemically inappropriate for the settlement of delicate coral larvae. Additionally, these artificial reef designs often fail to account for and provide for the preferred microhabitats of settling coral larvae, such as the shaded undersides of coral plates. Finally, these artificial reefs are typically unsightly permanent structures, and due to their durability, these reefs preclude the opportunity for the natural coral reef to return to its original, pristine condition.

For the forgoing reasons, these conventional artificial reefs have not been widely accepted as means for repairing damaged coral reef ecosystems. Many coral reef ecologists and ecotourism operators regard these artificial reefs as a form of unattractive marine pollution with little remediation benefit and low potential for increasing ecotourism or fisheries' revenues.

In light of the problems associated with the above discussed artificial reef structures, there is a need for a device made from nonpollutants which closely approximates the natural underwater habitat provided by thriving coral reefs. Moreover, there is a need for a non-permanent device which will degrade over a period of ten to twenty years (a typical minimum time span for coral reef establishment on denuded substrate), such that lasting signs of human intervention are minimized in the re-established ecosystem.

Accordingly, it is an object of the present invention to provide an artificial reef module for coral reef remediation that will closely approximate a natural coral reef habitat in order to attract the proper marine life to facilitate the re-growth of damaged coral and to facilitate the growth of new coral. It is another object of the present invention to provide an artificial reef module for coral reef remediation made from nonpolluting materials that will degrade over time to minimize evidence of human intervention.

It is another object of the present invention to provide an artificial reef module for coral reef remediation which, through the process of degradation, will approximate natural fragmentation of branching types of coral to aid in the dissemination of young corals and facilitate the reproduction of the coral. It is another object of the present invention to provide an artificial reef module for coral reef remediation that may be constructed from mass produced, prefabricated components to facilitate the deployment of the artificial reef modules in large numbers at low cost.

It is another object of the present invention to provide an artificial reef module for coral reef remediation that may be easily deployed freestanding or anchored and creates a useful habitat regardless of orientation on the ocean floor. It is another object of the present invention to provide an artificial reef module for coral reef remediation that may be easily modified or customized for a particular requirement or need by making simple variations in the dimensions or geometry of the module. It is yet another object of the present invention to provide an artificial reef module for coral reef remediation which, when deployed in plurality, creates an artificial reef structure with a natural, organic underwater appearance that is visually appealing to swimmers, snorkelers, and SCUBA divers.

SUMMARY OF THE PRESENT INVENTION

The artificial reef module for coral reef remediation of the present invention includes a central body having an upper settling plate with an upper and lower surface, a middle settling plate with an upper and lower surface, and a lower settling plate with an upper and lower surface. Extending from the central body is a plurality of primary tines.

The primary tines include supporting tines, stabilizing tines, and space filling tines. Each primary tine includes a tip and a base and extending from each primary tine is a plurality of secondary tines. The branching of the tines closely replicates the appearance of natural branching coral.

The supporting tines and the stabilizing tines extend at an angle from the upper surface of the upper settling plate and the lower surface of the lower settling plate. The space filling tines extend radially outward from the middle settling plate. A plurality of vertical ribs provide support for the settling plates and the primary tines. The artificial reef module for coral reef remediation is symmetrical about the horizontal center line and the vertical center line.

The supporting tines and the stabilizing tines are oriented such that the tips of these tines are approximately the same vertical distance from the upper and lower settling plates. This allows the artificial reef module for coral reef remediation to rest stably on the ocean floor or seabed.

The artificial reef module for coral reef remediation may be constructed from six identical artificial reef module subcomponents. Each subcomponent may include five primary tines, a plurality of secondary tines, one vertical rib, and a one-sixth pie-shaped piece of each settling plate. In this configuration, the primary tines and the secondary tines would be vertically aligned, which would facilitate construction of the subcomponents from two-piece molds.

An artificial reef constructed from the deployment of a plurality of artificial reef modules for coral reef remediation in a close-packed array would result in a spatially complex habitat that provides a myriad of interstitial spaces well suited for sheltering the small reef fish important to sustaining a healthy, robust coral reef. The shaded lower surfaces of the upper, middle, and lower settling plates provide a protective microhabitat which is suitable to coral larvae seeking to settle and grow. Additionally, over time the individual artificial reef modules for coral reef remediation will slowly degrade and allow the tines to break off. This degradation closely approximates the fragmentation that occurs with natural branching coral.

Moderate wave action and water current will cause the primary and secondary tines of different artificial reef modules for coral reef remediation to become more interlocked than when initially deployed. However, increased motion due to the water may cause individual artificial reef modules for coral reef remediation to dislodge. Therefore, it may be necessary to include an anchor which would be inserted through a hole formed in the central body of the artificial reef module for coral reef remediation and anchored in the seabed.

The artificial reef module for coral reef remediation of the present invention overcomes the disadvantages of the prior art described above because it provides an artificial reef module which closely approximates a natural coral reef habitat in order to attract the proper marine life to facilitate the re-growth of damaged coral and to facilitate the growth of new coral. Moreover, artificial reef module for coral reef remediation of the present invention is made from non-polluting materials that will dissolve over time to minimize evidence of human intervention.

The dissolution of the artificial reef module for coral reef remediation of the present invention will allow it to break apart under wave action and moderate underwater currents. This will approximate the natural fragmentation of branching types of coral to aid in the dissemination of young corals and facilitate the reproduction of the coral. The artificial reef module for coral reef remediation may also be constructed from mass produced, prefabricated components to facilitate the deployment of the artificial reef modules in large numbers at low cost.

Finally, the artificial reef module for coral reef remediation provides an artificial reef module which, when deployed in plurality, creates an artificial reef structure with a natural, organic underwater appearance that is visually appealing to swimmers, snorkelers, and SCUBA divers.

BRIEF DESCRIPTION OF THE DRAWINGS

The novel features of this invention, as well as the invention itself, both as to its structure and its operation, will be best understood from the accompanying drawings, taken in conjunction with the accompanying description, in which reference characters refer to similar parts, and in which.

DETAILED DESCRIPTION OF A PREFERRED EMBODIMENT

Figure 1:
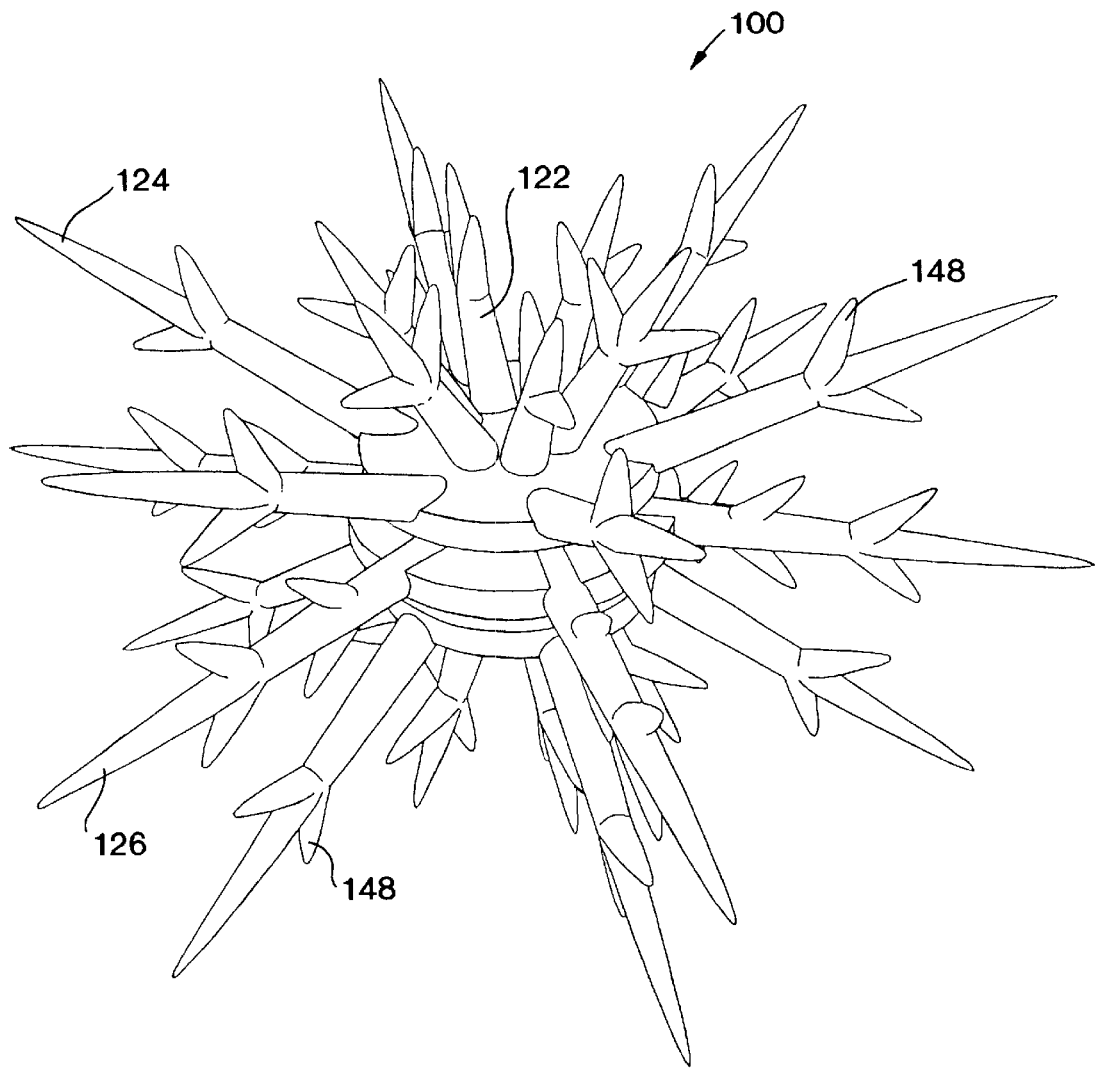
FIG. 1 is a perspective view of the Artificial Reef Module For Coral Reef Remediation showing a central body having an upper plate, a middle plate, and a lower plate and having a number of supporting tines, stabilizing tines, and space filling tines.
Figure 2:
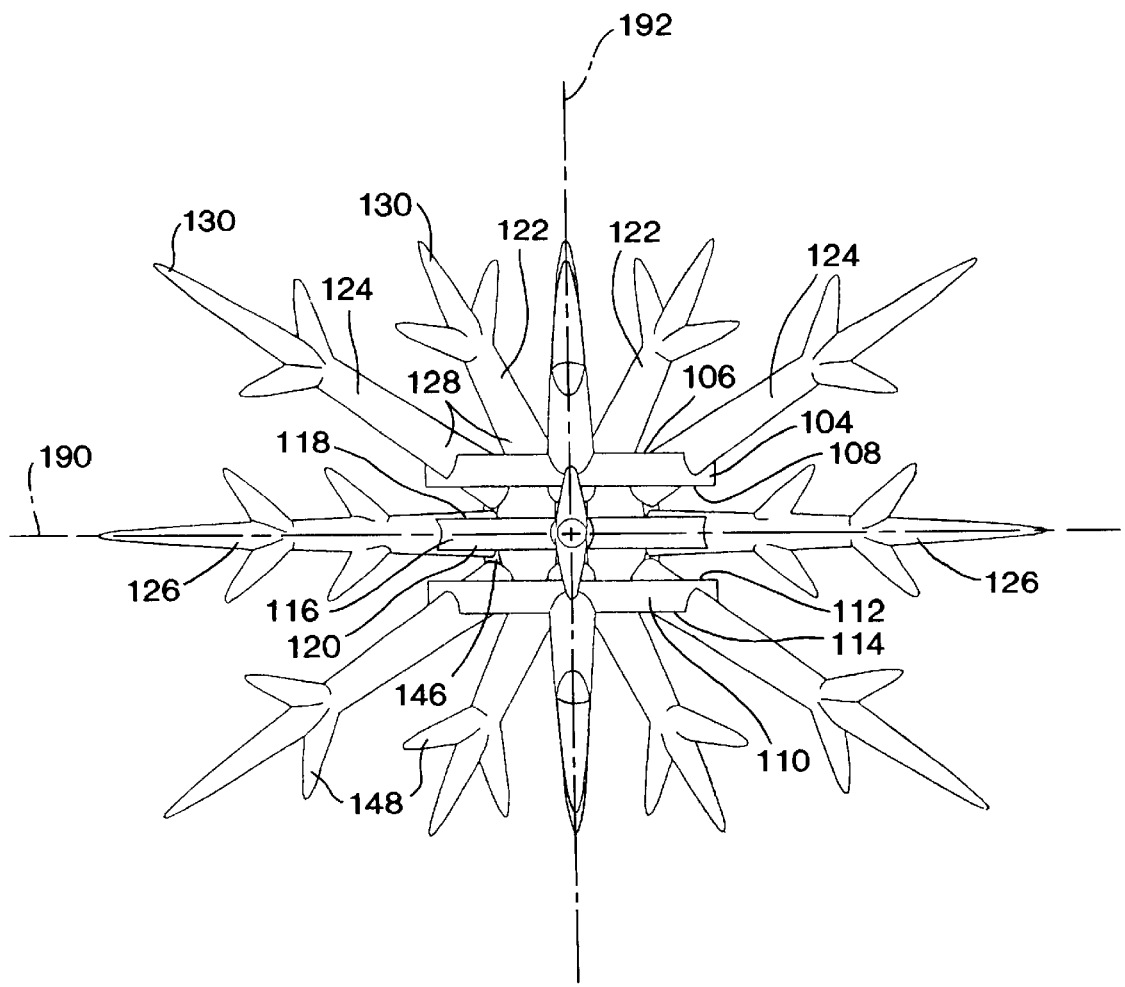
FIG. 2 is a front plan view of the Artificial Reef Module For Coral Reef Remediation.

Referring initially to FIGS. 1 and 2, a preferred embodiment of the Artificial Reef Module For Coral Reef Remediation is shown and generally designated 100. The artificial reef module for coral reef remediation 100 includes a central body 102 having an upper settling plate 104 with an upper surface 106 and a lower surface 108; a lower settling plate 110 with an upper surface 112 and a lower surface 114; and a middle settling plate 116 with an upper surface 118 and a lower surface 120.

Figure 3:
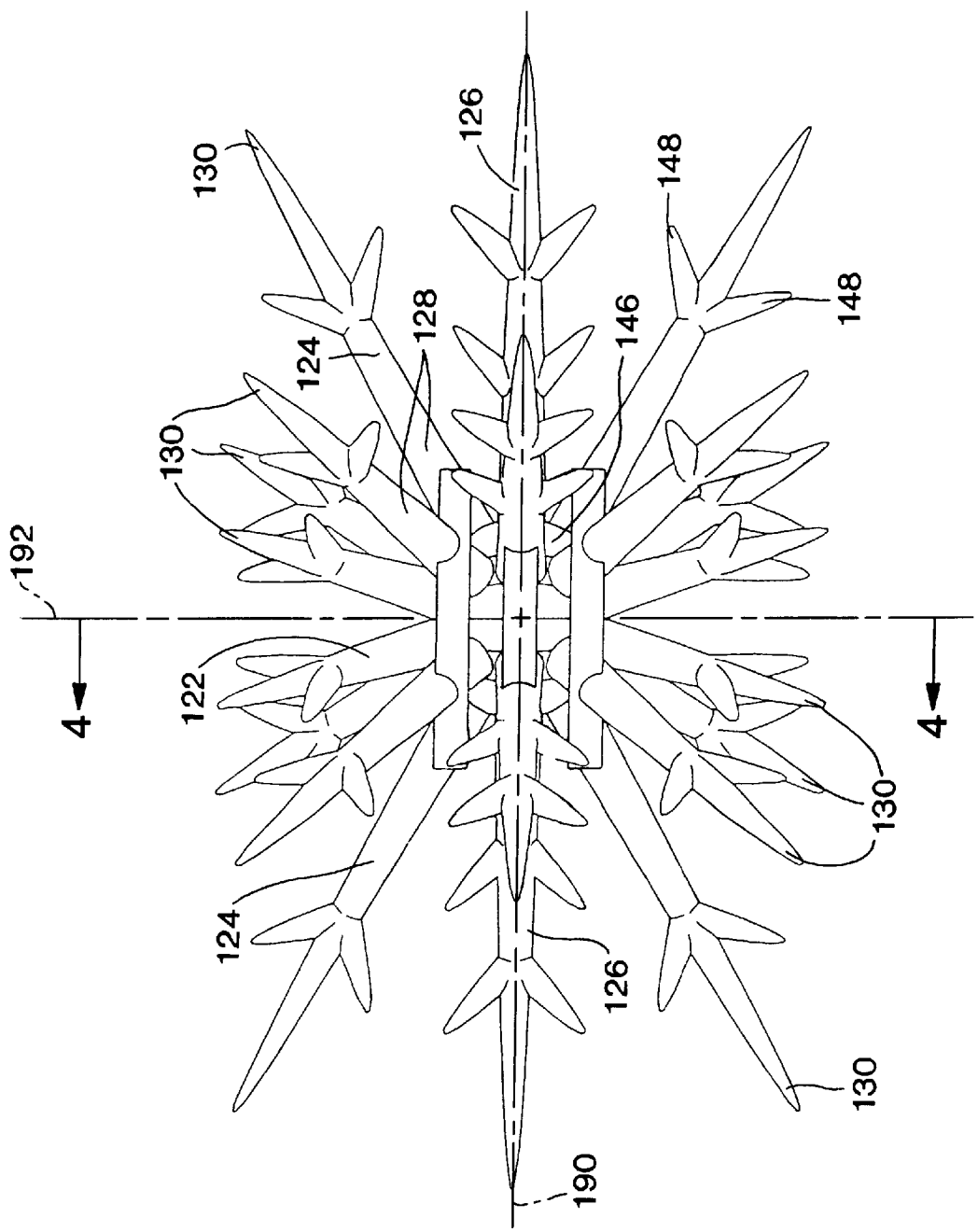
FIG. 3 is a side plan view of the Artificial Reef Module For Coral Reef Remediation.

Referring now to FIGS. 2 and 3, it is shown that the artificial reef module for coral reef remediation 100 is symmetrical about the horizontal center line 190 and the vertical center line 192. Emanating from the central body 102 is a plurality of supporting tines 122, a plurality of stabilizing tines 124 and a plurality of space filling tines 126. These tines 122, 124, and 126 each have a base 128 and a tip 130. Moreover, these tines 122, 124, and 126 are the primary tines and may be referred to as such throughout this remainder of this document.

Figure 9:
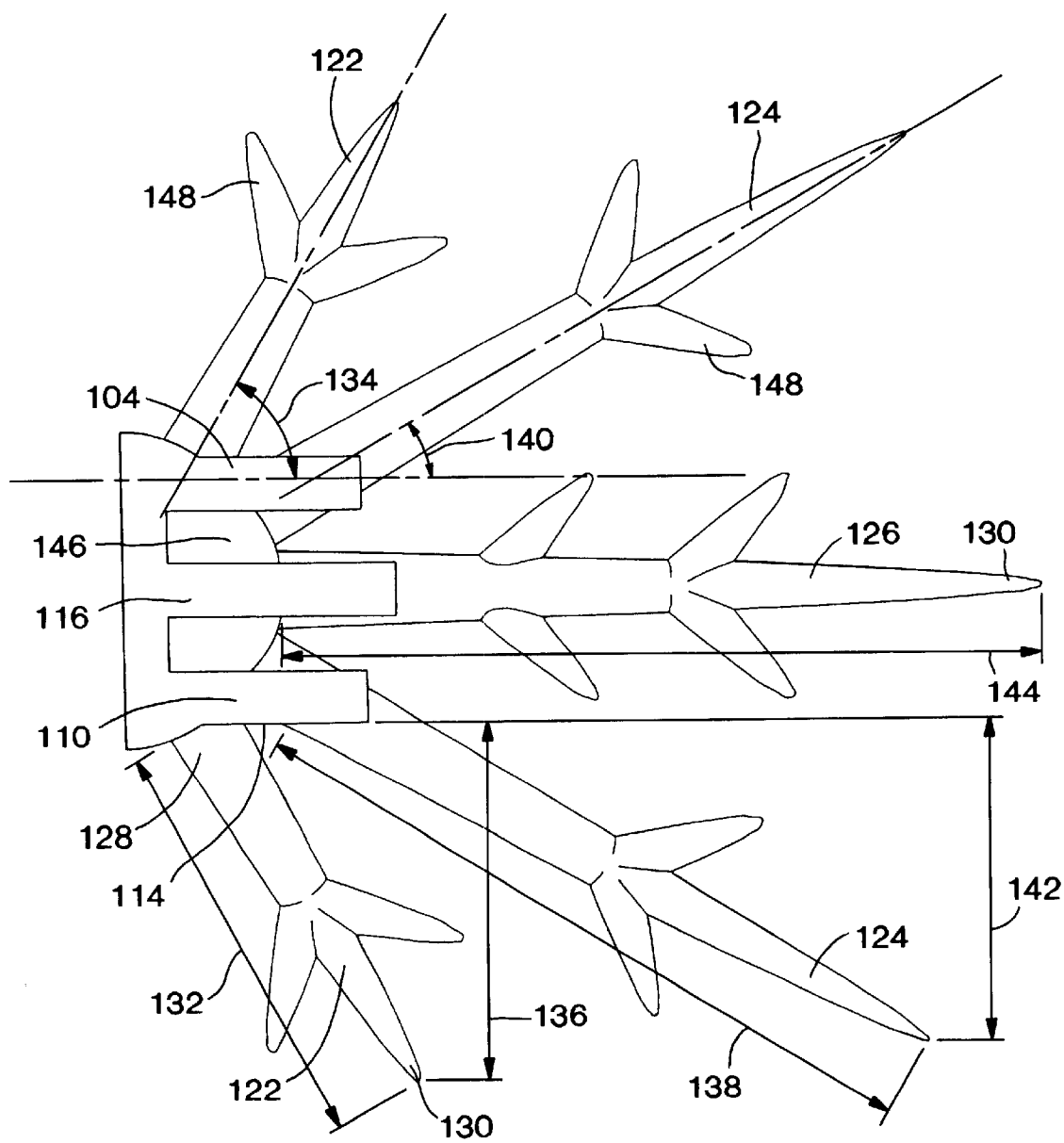
FIG. 9 is a side plan view of the artificial reef module subcomponent.

Referring ahead briefly to FIG. 9, it is shown that each supporting tine 122 has a length 132 and extends from either the upper settling plate 104 or the lower settling plate 110 at a first angle 134. The tip 130 of each supporting tine 122 may then be located a vertical distance 136 from the upper surface 106 of the upper settling plate 104 or a vertical distance 136 from the lower surface 114 of the lower settling plate 110.

Similarly, each stabilizing tine 124 has a length 138 and extends from either the upper settling plate 104 or the lower settling plate 106 at a second angle 140. The tip 130 of each stabilizing tine 124 may then be located a vertical distance 142 either from the upper surface 106 of the upper settling plate 104 or from the lower surface 114 of the lower settling plate 110.

Depending on the angles 134 and 140 that the supporting tines 122 and stabilizing tines 124 form with the upper and lower settling plates 104 and 110, the lengths 132 and 138 of these tines 122 and 124 will be such that the vertical distances 136 and 142 that the tips 130 of these tines 122 and 124 are from the upper and lower settling plates 104 and 110 may be approximately the same. FIGS. 2 and 9 further show that the space filling tines 126 have a length 144 and extend radially outward from the middle settling plate 116. The lengths 132 and 138 of the supporting tines 122 and the stabilizing tines 124 allow the artificial reef module for coral reef remediation 100 to stably rest on the seafloor—even if it is inverted.

Referring back to FIGS. 1 through 4, it is shown that the central body 102 of the artificial reef module for coral reef remediation 100 includes a plurality of vertical ribs 146 which provide structural support for the settling plates 104, 110 and 116. The vertical ribs 146 also provide structural support for the bases 128 of the primary tines 122, 124, and 126 where they converge at the central body 102.

FIGS. 1 through 4 also show that a plurality of secondary tines 148 extend from the primary tines 122, 124, and 126. The configuration of the primary tines 122, 124, and 126 and the secondary tines 148 are designed to approximate natural branching hard coral. It can be appreciated that tertiary tines (not shown) may further extend from secondary tines 148 and that quaternary tines (not shown) may even further extend from the tertiary tines (not shown). The additional tines would increase the branching effect and further replicate the natural branching of hard coral.

Figure 4:
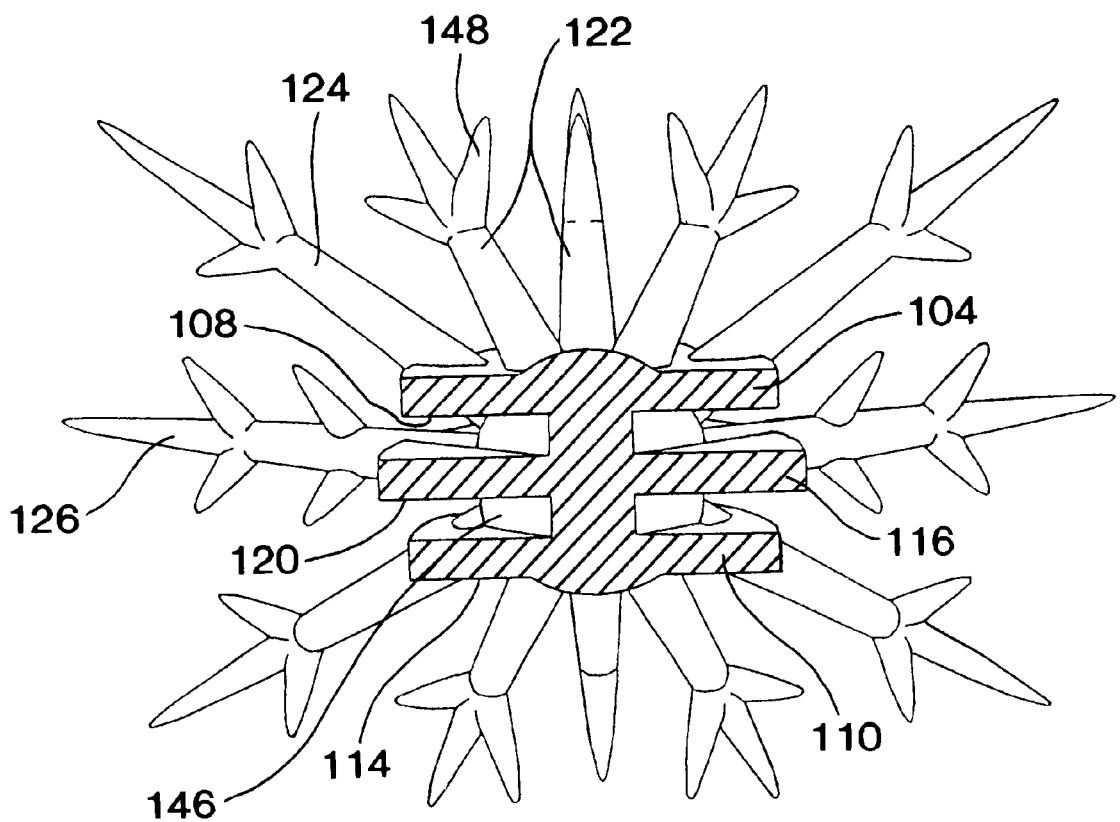
FIG. 4 is a cross-section view of the Artificial Reef Module For Coral Reef Remediation taken along Line 4—4 in FIG. 3.

A cross-section of the artificial reef module for coral reef remediation 100 is shown in FIG. 4. This cross-section shows the spaces formed in the central body 102 between the settling plates 104, 110, and 116. When properly placed on the ocean floor or seabed, the shaded lower surfaces 108, 114, and 120 of the settling plates 104, 110, and 116 provide a protective microhabitat that is attractive to coral larvae seeking a place to settle and grow.

Figure 5:
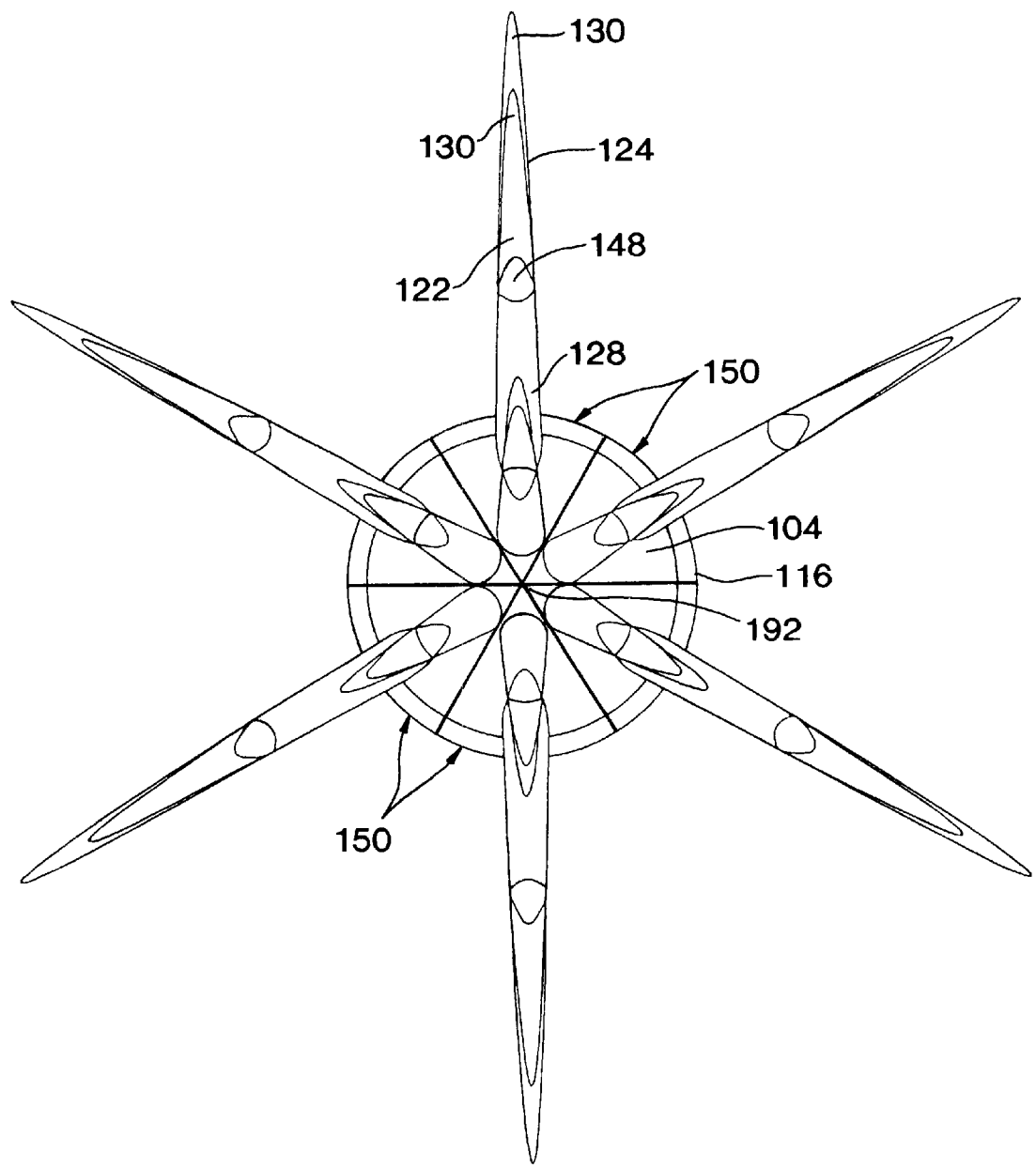
FIG. 5 is a top plan view of the Artificial Reef Module For Coral Reef Remediation showing the six part central body.
Figure 6:
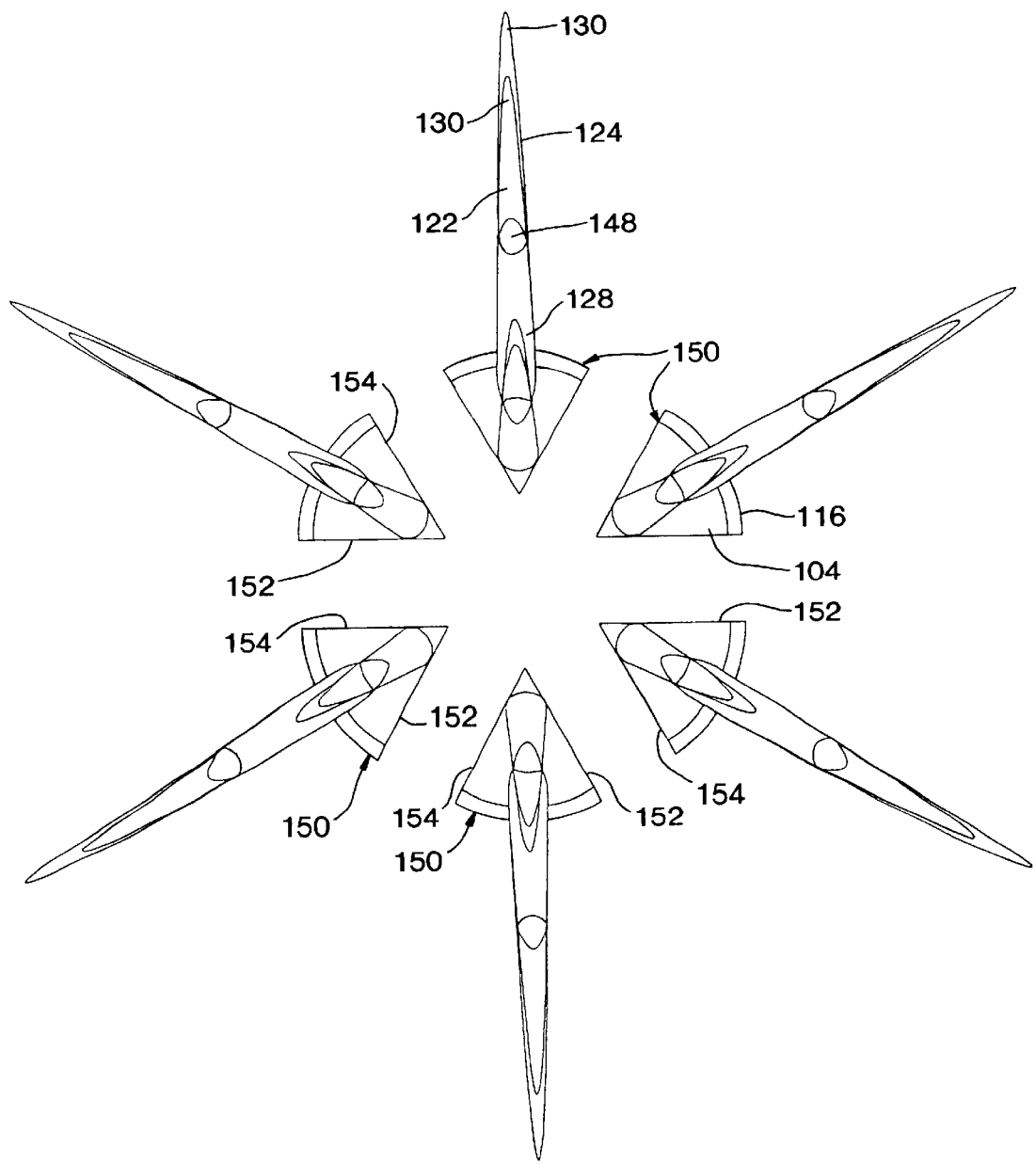
FIG. 6 is a top plan view of the Artificial Reef Module For Coral Reef Remediation showing it separated into six equal artificial reef module subcomponents.

Referring now to FIGS. 5 and 6, it is shown that a preferred embodiment of the artificial reef module for coral reef remediation 100 may be constructed from six identical artificial reef module subcomponents 150 radially spaced around the vertical axis 192. It can be appreciated that the artificial reef module for coral reef remediation 100 may be divided into nearly any reasonable number of equal and identical subcomponents 150.

Figure 7:
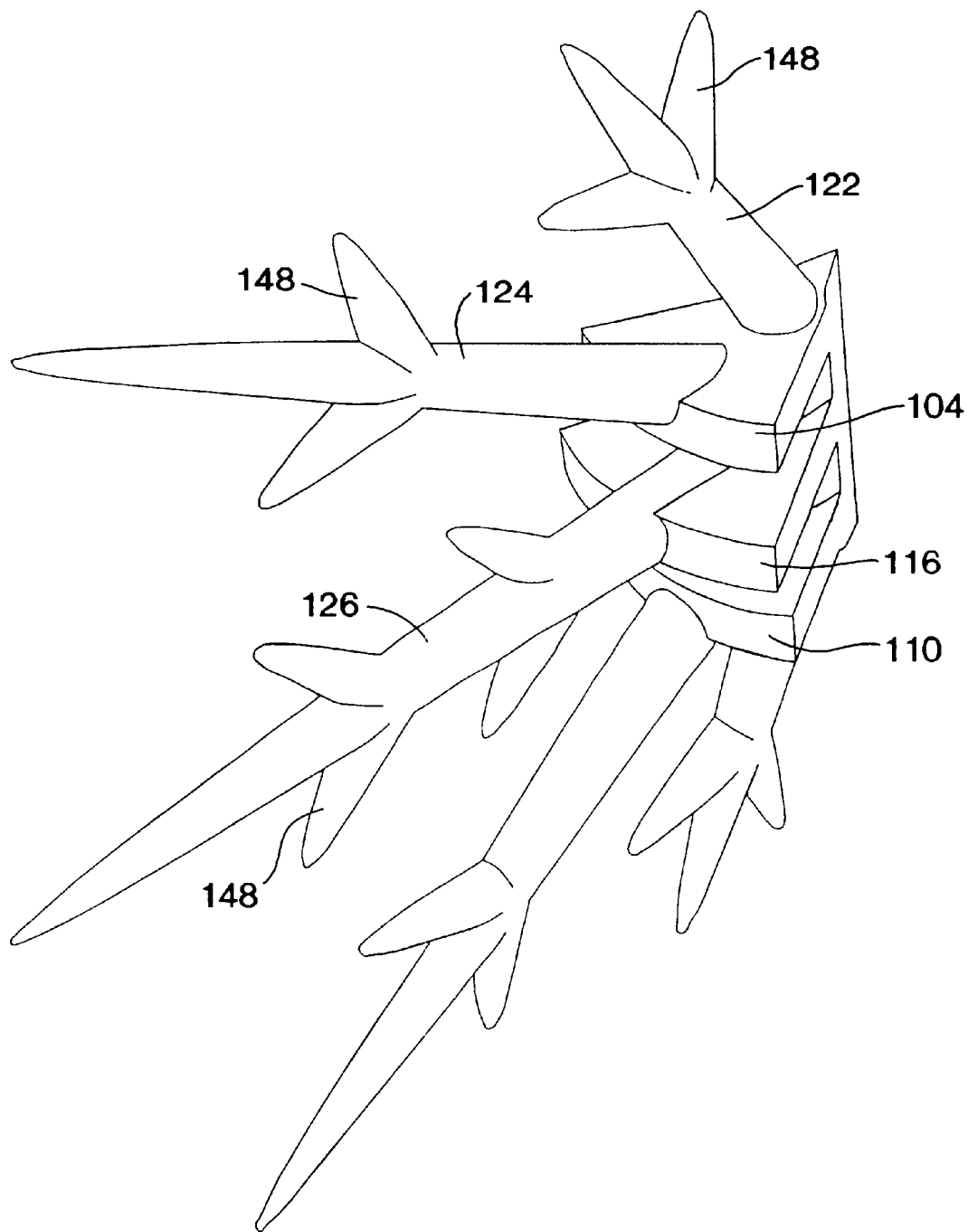
FIG. 7 is front perspective view of the artificial reef module subcomponent.
Figure 8:
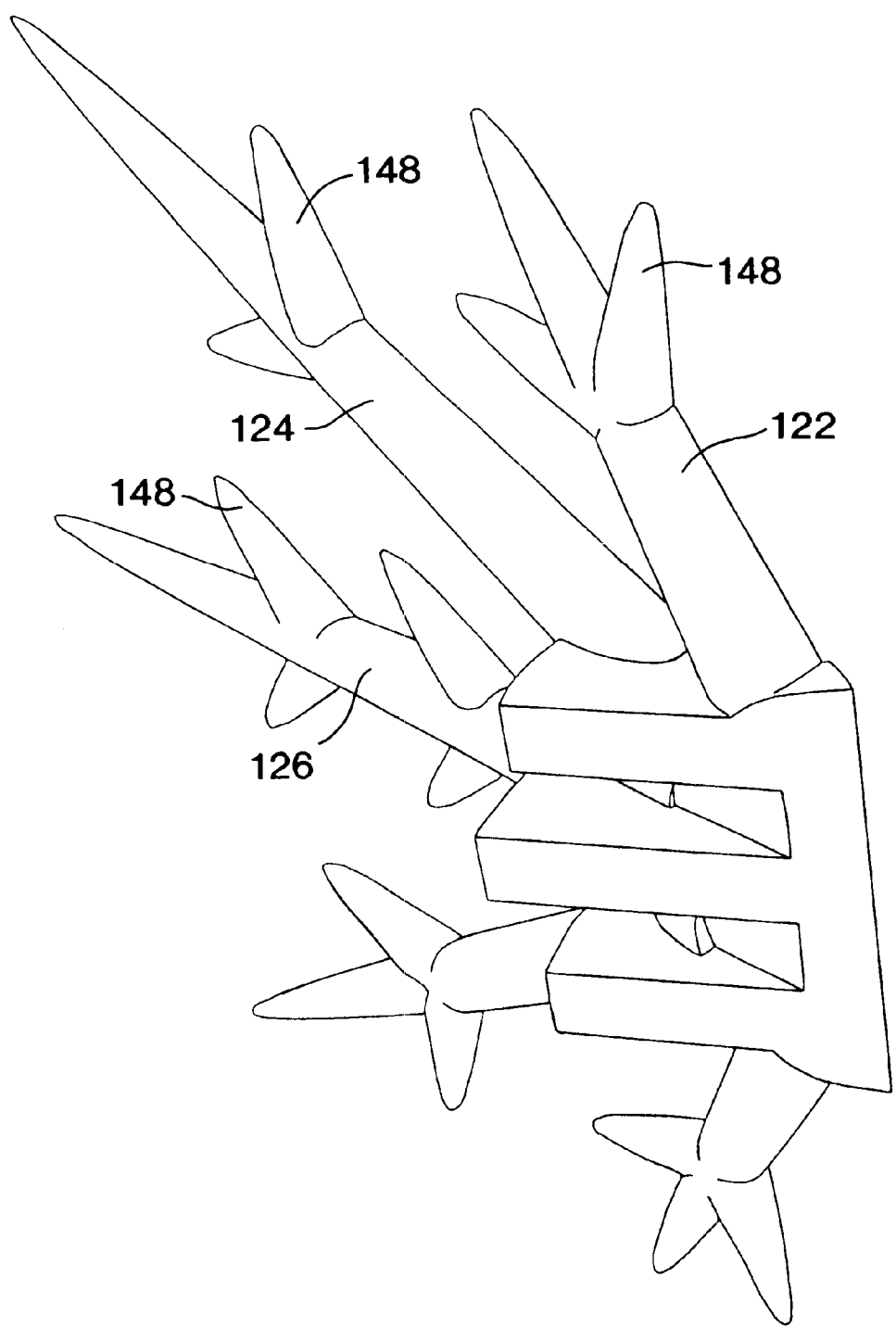
FIG. 8 is a rear perspective view of the artificial reef module subcomponent.

FIGS. 7 through 9 show that each artificial reef module subcomponent 150 may include five primary tines 122, 124, and 126: including two supporting tines 122, two stabilizing tines 124 and a single space filling tine 126. Each primary tine 122, 124, and 126 may further include a plurality of secondary tines 148 extending outwardly along the length of the primary tine 122, 124, and 126.

In a preferred embodiment, each artificial reef module subcomponent 150 accounts for one-sixth (⅙) of the complete artificial reef module for coral reef remediation 100 and includes a one-sixth (⅙) pie-shaped portion of each settling plate 104, 110, and 116. Each artificial reef module subcomponent 150 may also include a single vertical rib 144 providing support for the primary tines 122, 124, and 126 and the portions of the settling plates 104, 110, and 116 included in the construction of the subcomponent 150.

FIG. 6 shows that each artificial reef module subcomponent 150 includes a first mating surface 152 and a second mating surface 154. When properly constructed, the first mating surface 152 of one artificial reef module subcomponent 150 maintains proper contact with the second mating surface 154 of another artificial reef module subcomponent 150. The artificial reef module subcomponents 150 may be joined using an epoxy adhesive, wire, or any other means well known in the art.

New Paragraph

Figures 10, 11, 12:
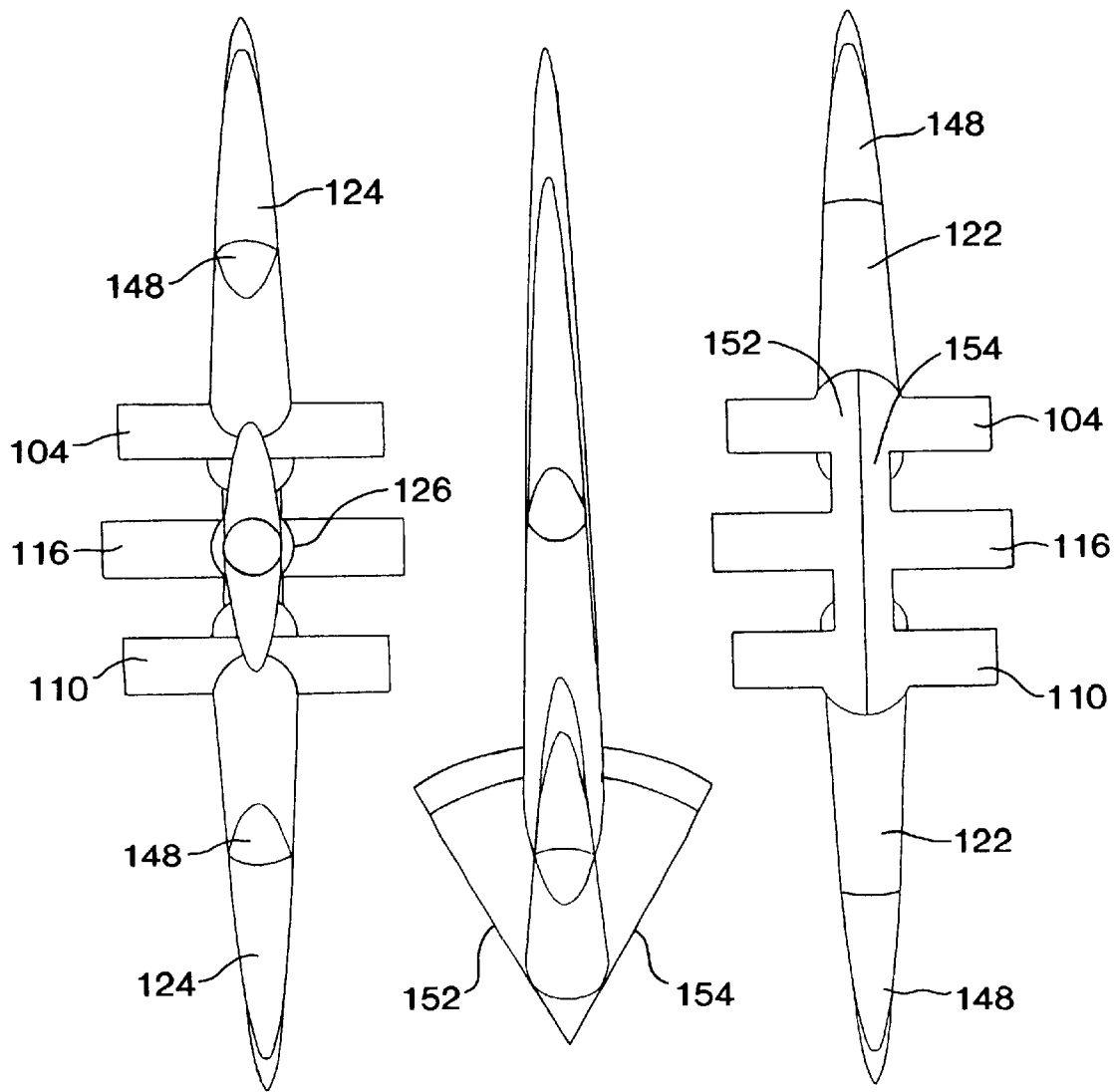
FIG. 10 is a front plan view of the artificial reef module subcomponent.
FIG. 11 is a top plan view of the artificial reef module subcomponent.
FIG. 12 is a rear plan view of the artificial reef module subcomponent.

Referring now to FIGS. 5 and 6 in conjunction with FIGS. 10 through 12, it is shown that the primary tines 122, 124, and 126 and secondary tines 148 extending from the artificial reef module subcomponent 150 are vertically aligned. This configuration allows the artificial reef module subcomponents 150 to be easily manufactured using a two-piece mold.

In a preferred embodiment, the artificial reef module for coral reef remediation 100 is constructed from a strong, yet brittle, ceramic material which will slowly degrade over time due to breakage by wave action or dissolution by salt water. Suitable ceramic can be any high-fire non-toxic porcelain, such as is commonly used in the manufacture of plumbing fixtures, bathroom tile, electrical insulators, etc. Rates of degradation will depend on the robustness of the preferred embodiment and the maximum wave energy of the intended reef environment. It can be appreciated that any other material well known in the art with similar characteristics may be used.

Figure 13:
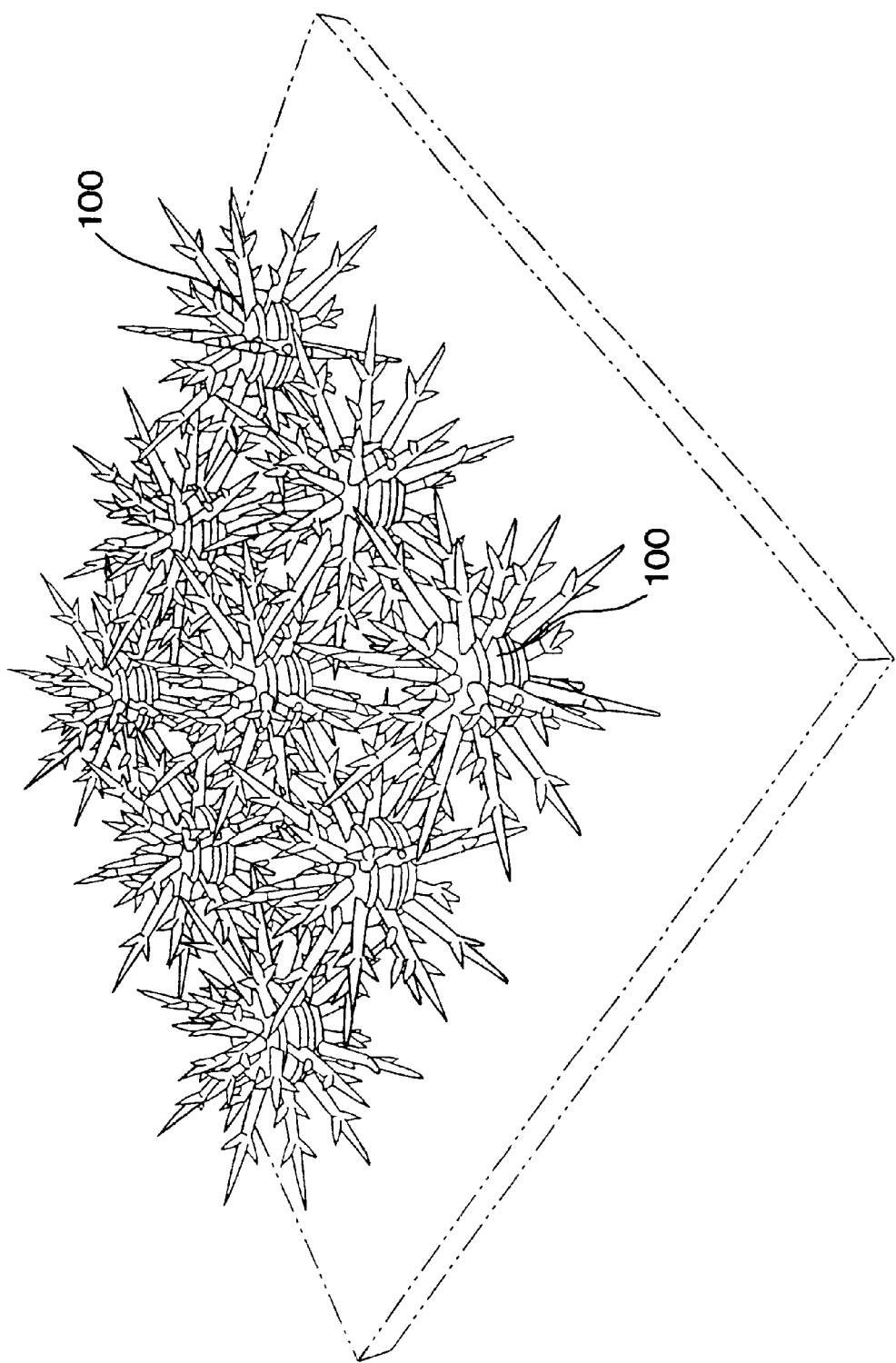
FIG. 13 is a perspective view of an artificial reef formed by a plurality of the Artificial Reef Module For Coral Reef Remediation deployed in a close packed array on the seafloor.

Referring now to FIG. 13, an artificial reef constructed from a plurality of artificial reef modules for coral reef remediation 100 deployed in a close-packed array is shown and designated 160. The spatially complex habitat created by the interlocking of the primary tines 122, 124, 126 and the secondary tines 148 of each individual artificial reef module for coral reef remediation 100 substantially replicates the habitat provided by thickets of branching corals, and the intersticial spaces created by these interlocking tines 122, 124, 126, 146 are well suited for sheltering the small reef fish important to the growth and regrowth of natural coral. Moderate wave action may cause the artificial reef modules for coral reef remediation 100 to become more intertwined and may thereby cause the artificial reef 160 to become more static.

Figure 14:
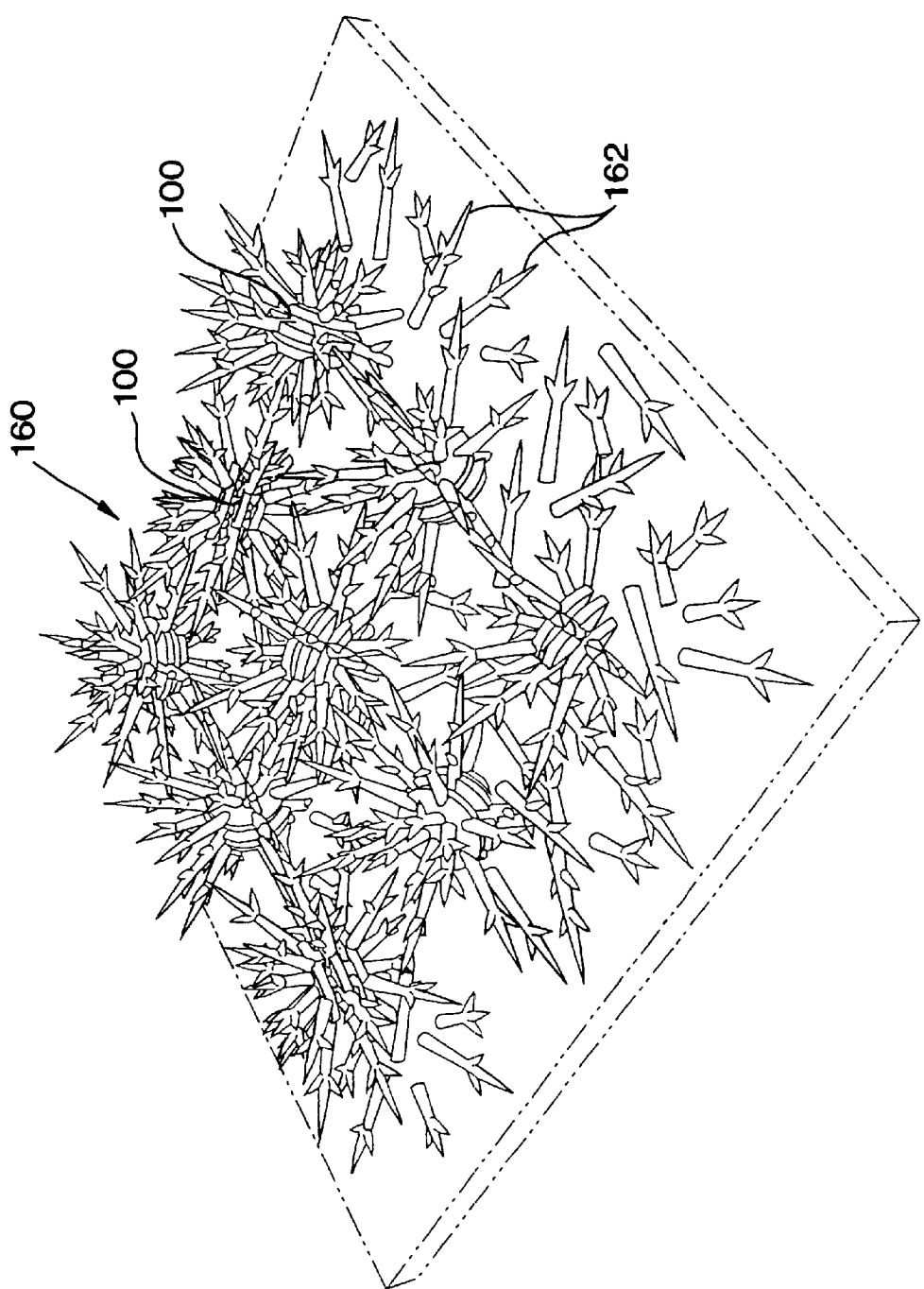
FIG. 14 is a perspective view of an artificial reef formed by a plurality of the Artificial Reef Module For Coral Reef Remediation deployed in a close packed array on the seafloor showing partial degradation of the individual reef modules.

FIG. 14 shows the artificial reef 160 constructed from the artificial reef modules for coral reef remediation 100 in a stage of partial degradation. FIG. 14 shows a plurality of tine fragments 162 which have been broken off the artificial reef modules for coral reef remediation 100 and scattered by wave action. The scattered tine fragments 162 contribute to the reef framework, are incorporated into reef sediments, or if bearing young corals, this fragmentation facilitates the spread and establishment of live coral cover on the reef and closely approximates the natural fragmentation process which commonly occurs with branching corals.

Figure 15:
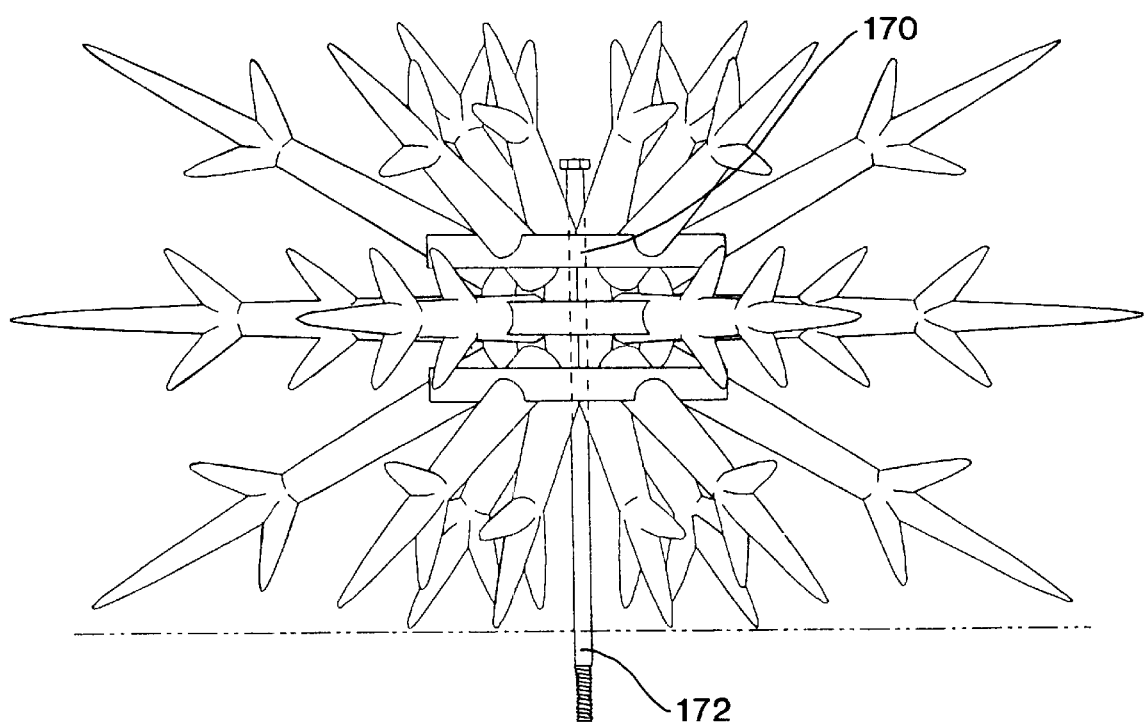
FIG. 15 is a side plan view of the Artificial Reef Module For Coral Reef Remediation, anchored to the substrate by an axial bolt.

Referring briefly to FIG. 15, it is shown that the central body 102 of the artificial reef module for coral reef remediation 100 may be formed with a vertical hole 170 through its center. In areas of high currents, it may be desirable to anchor the artificial reef module for coral reef remediation 100. Therefore, the artificial reef module for coral reef remediation 100 may be anchored to the reef substrate by inserting an anchor 172 through the hole 170 in the central body 102. Following the degradation of the artificial reef module for coral reef remediation 100, the anchor 172 may be retrieved from the reef substrate. In a preferred embodiment, the anchor may be a bolt, a spike or any other similar device, but it can be appreciated that a plastic or metal tether may be used in lieu of a bolt or a spike.

Description of a First Alternative Embodiment

Figure 16:
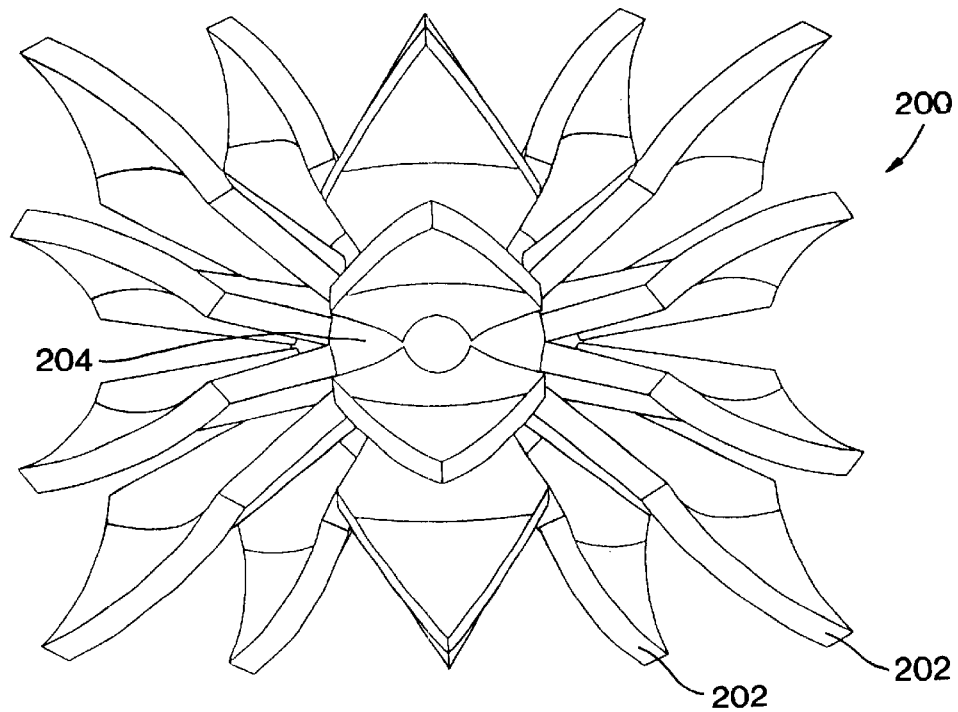
FIG. 16 is a front plan of a first alternative embodiment of the Artificial Reef Module For Coral Reef Remediation.
Figure 17:
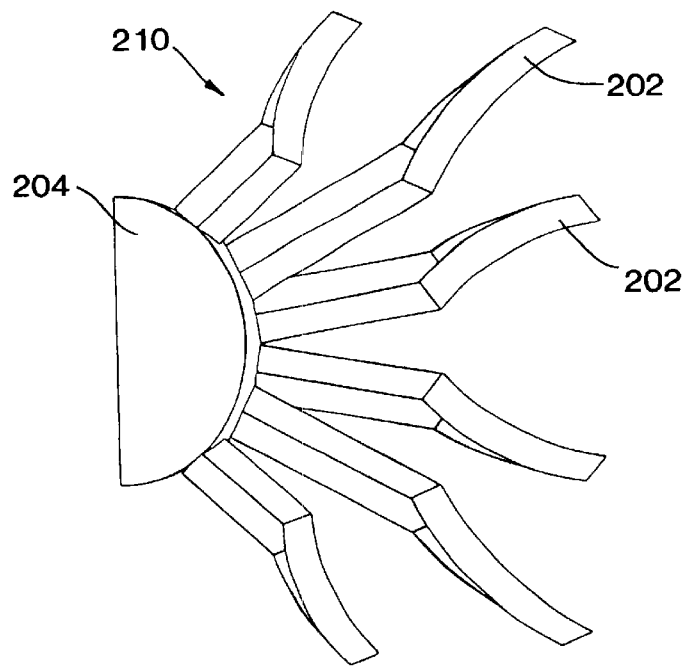
FIG. 17 is a side plan view of the subcomponent of the alternative embodiment of the Artificial Reef Module For Coral Reef Remediation shown in FIG. 16.

Referring now to FIG. 16, a first alternative embodiment of the artificial reef module for coral reef remediation is shown and designated 200. FIGS. 16 and 17 show that the reef module for coral reef remediation 200 includes a plurality of spade-shaped tines 202 emanating from a central body 204. FIG. 17 shows an artificial reef module subcomponent 210 having six (6) spade-shaped tines 202 extending from it, but it can be appreciated that, space permitting, nearly any number of spade-shaped tines 202 may be include in the construction of the subcomponent 120. Much like the preferred embodiment, this embodiment of the artificial reef module for coral reef remediation 200 may be constructed by assembling six (6) identical subcomponents 210.

The spade-shaped tines 202 maximize the surface area of the artificial reef module for coral reef remediation 200 which, in turn, maximizes the settlement of coral larvae. Moreover, FIG. 17 shows that the spade-shaped tines 202 are curved in order to help anchor the artificial reef module for coral reef remediation 200 to the ocean floor or seabed and to prevent the accumulation of settlement on the tines 202. Alternatively, this embodiment of the artificial reef module for coral reef remediation 200 may be anchored to the ocean floor or seabed in the same manner as the preferred embodiment, discussed above.

Description of a Second Alternative Embodiment

Figure 18:
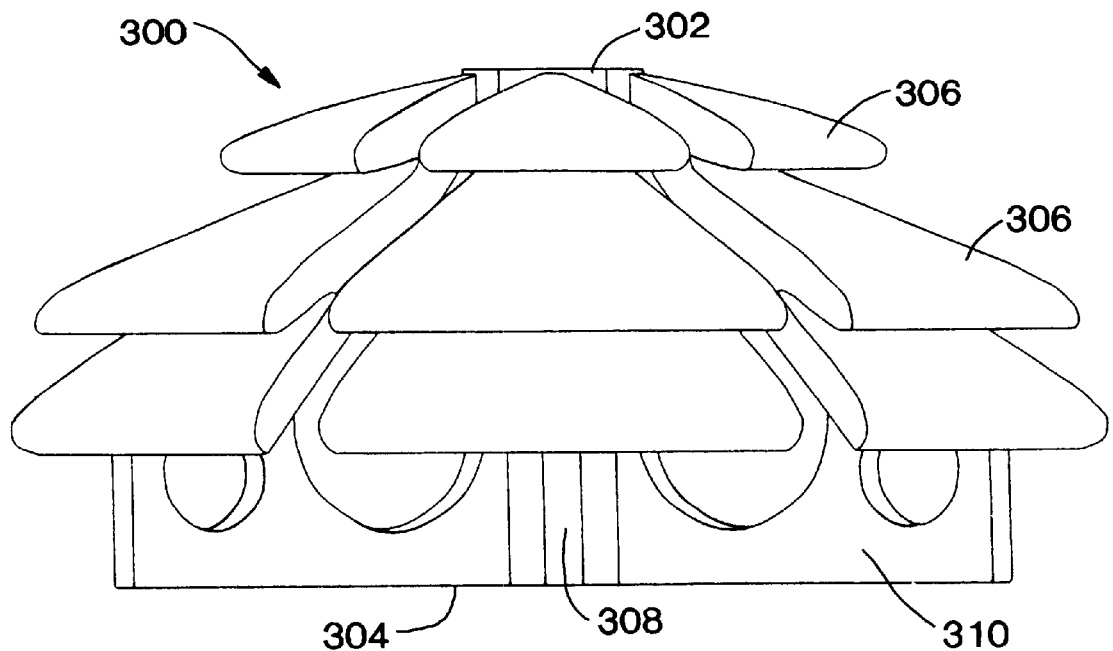
FIG. 18 is a front plan view of a second alternative embodiment of the Artificial Reef Module For Coral Reef Remediation.
Figure 19:
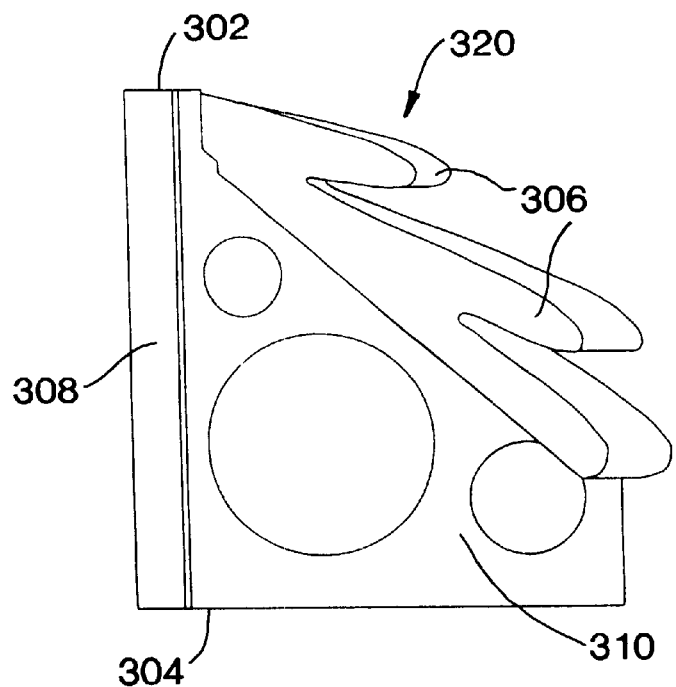
FIG. 19 is a side plan view of the subcomponent of the alternative embodiment of the Artificial Reef Module For Coral Reef Remediation shown in FIG. 18.

Referring now to FIG. 18, a second alternative embodiment of the artificial reef module for coral reef remediation is shown and designated 300. FIGS. 18 and 19 show that this embodiment of the artificial reef module for coral reef remediation 300 has a top 302 and a bottom 304 and includes plurality of lobes 306 extending from a central core 308 and supported by a plurality of internal braces 310.

FIG. 19 shows an artificial reef module subcomponent 320 having three (3) lobes 306 extending from it, but it can be appreciated that, space permitting, any number of lobes may be included in the construction of the subcomponent 320. The lobes 306 increase in size from the top 302 of the artificial reef module subcomponent 320 to the bottom 304, and the lobes 306 serve to closely approximate the natural look of lobate brain corals. FIG. 17 also shows that the internal braces may be formed with a plurality of holes 312 which would allow passage of water through the artificial reef module for coral reef remediation 300 and minimize the motion due to wave action and water currents.

Much like the other embodiments, this embodiment of the artificial reef module for coral reef remediation 300 may be constructed by assembling six (6) identical subcomponents 320. Also, it may be anchored to the ocean floor or seabed in the same manner as the preferred embodiment, discussed above.

Description of a Third Alternative Embodiment

Figure 20:
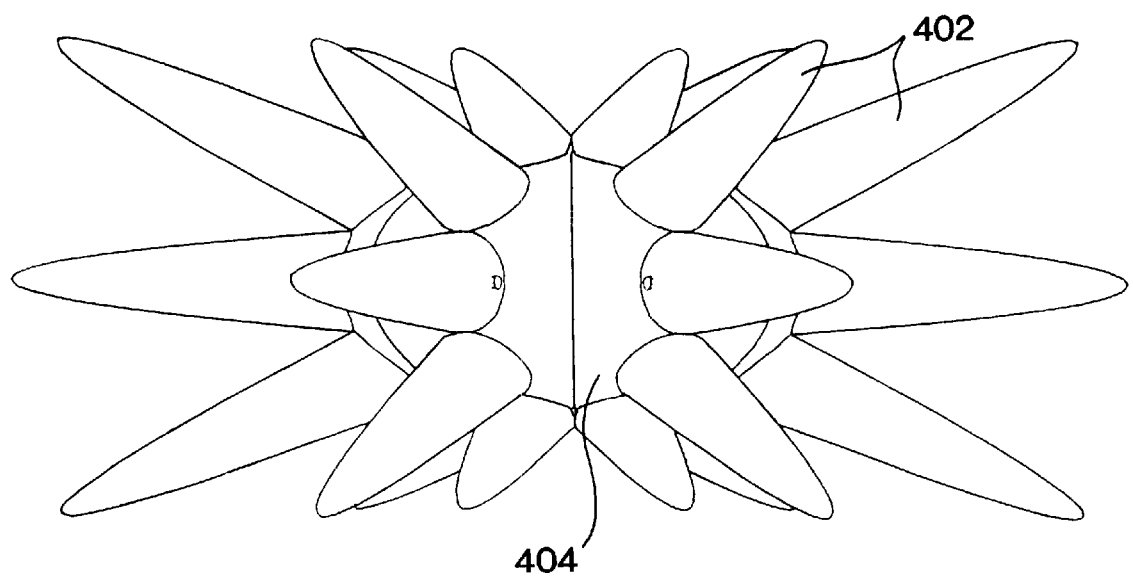
FIG. 20 is a front plan view of a third alternative embodiment of the Artificial Reef Module For Coral Reef Remediation.
Figure 21:
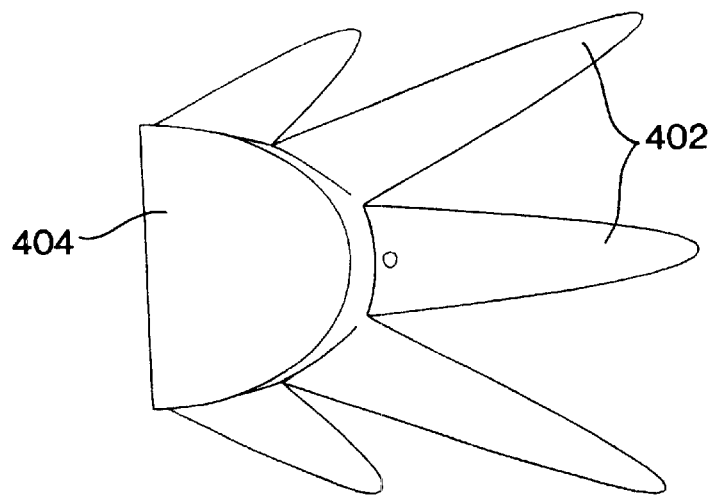
FIG. 21 is a side plan view of the subcomponent of the alternative embodiment of the Artificial Reef Module For Coral Reef Remediation shown in FIG. 20.

Referring now to FIG. 20, a third alternative embodiment of the artificial reef module for coral reef remediation is shown and designated 400. FIGS. 20 and 21 show that this embodiment of the artificial reef module for coral reef remediation 400 includes a plurality of primary tines 402 extending from a central body 404. This embodiment of the artificial reef module for coral reef remediation 400 closely resembles the artificial reef module for coral reef remediation, however it does not include any secondary tines 148 as shown in FIGS. 1 through 15.

This embodiment of the artificial reef module for coral reef remediation 400 may be useful in high energy settings where it would be desirable to prolong the durability of the artificial reef module for coral reef remediation 400 by modifying the aspect ratio of the tines 402 and eliminating any secondary branches. This embodiment is more oblate and robust than the preferred embodiment and may be deployed in environments with higher wave energy.

While the artificial reef module for coral reef remediation of the present invention as herein shown and disclosed in detail is fully capable of obtaining the objects and providing the advantages herein before stated, it is to be understood that it is merely illustrative of a preferred embodiment and several alternative embodiments of the present invention and that no limitations are intended to the details of construction or design herein shown other than as described in the appended claims.

I claim:

1. An artificial reef module for coral reef remediation comprising:
   a central body having an upper settling plate with an upper surface and a lower surface, a middle settling plate with an upper surface and a lower surface, and a lower settling plate with an upper surface and a lower surface;
   a plurality of supporting tines extending at a first angle from said upper surface of said upper settling plate and from said lower surface of said lower settling plate, each said supporting tine having a tip and a base;
   a plurality of stabilizing tines extending at a second angle from said upper surface of said upper settling plate and from said lower surface of said lower settling plate, each said stabilizing tine having a tip and a base; and
   a plurality of space filling tines extending radially outward from said middle settling plate, each said space filling tine having a tip and a base.

2. The artificial reef module for coral reef remediation of claim 1, wherein the central body further comprises a plurality of vertical ribs providing added support and stability for said upper, middle, and lower settling plates and said supporting, stabilizing, and space filling tines.

3. The artificial reef module for coral reef remediation of claim 2, further including a plurality of secondary tines extending from said supporting tines.

4. The artificial reef module for coral reef remediation of claim 3, further including a plurality of secondary tines extending from said stabilizing tines.

5. The artificial reef module for coral reef remediation of claim 4, further including a plurality of secondary tines extending from said space filling tines.

6. The artificial reef module for coral reef remediation of claim 5, wherein said tips of said supporting tines and said tips of said stabilizing tines extending from said lower settling plate are approximately the same vertical distance from said lower surface of said lower settling plate.

7. The artificial reef module for coral reef remediation of claim 6, wherein said tips of said supporting tines and said tips of said stabilizing tines extending from said upper settling plate are approximately the same vertical distance from said upper surface of said upper settling plate.

8. The artificial reef module for coral reef remediation of claim 7, wherein said artificial reef module for coral reef remediation is symmetrical about its horizontal center line.

9. The artificial reef module for coral reef remediation of claim 8, wherein said artificial reef module for coral reef remediation is symmetrical about its vertical center line.

10. The artificial reef module for coral reef remediation of claim 9, wherein said artificial reef module for coral reef remediation is radially sectioned into six identical artificial reef module subcomponents around the vertical axis.

11. The artificial reef module for coral reef remediation of claim 10, wherein each said artificial reef module subcomponent includes a one-sixth pie-shaped portion of each said settling plate, two supporting tines, two stabilizing tines, one space filling tine, and a plurality of secondary tines.

12. The artificial reef module for coral reef remediation of claim 11, wherein said supporting tines, said stabilizing tines, said space filling tine, and said secondary tines comprising said artificial reef module subcomponent are vertically aligned.

13. The artificial reef module for coral reef remediation of claim 12, further including tertiary tines extending from said secondary tines.

14. The artificial reef module for coral reef remediation of claim 13, further including quaternary tines extending from said tertiary tines.

15. The artificial reef module for coral reef remediation of claim 14 manufactured from a porous ceramic which will slowly dissolve in water.

16. The artificial reef module for coral reef remediation of claim 15, wherein said central body is formed with a hole through its vertical center.

17. The artificial reef module for coral reef remediation of claim 16, further including an anchor inserted through said hole formed in said central body.

18. An artificial reef comprising:
   a plurality of artificial reef modules for coral reef remediation deployed underwater in a close-packed array;
   wherein each said artificial reef module for coral reef remediation includes:
   a central body having an upper settling plate with an upper surface and a lower surface, a middle settling plate with an upper surface and a lower surface, and a lower settling plate with an upper surface and a lower surface;
   a plurality of supporting tines extending at a first angle from said upper surface of said upper settling plate and from said lower surface of said lower settling plate, each said supporting tine having a tip and a base;
   a plurality of stabilizing tines extending at a second angle from said upper surface of said upper settling plate and from said lower surface of said lower settling plate, each said stabilizing tine having a tip and a base; and
   a plurality of space filling tines extending radially outward from said middle settling plate, each said space filling tine having a tip and a base.

19. The artificial reef of claim 18, wherein each said artificial reef module for coral reef remediation further includes a plurality of vertical ribs providing added support and stability for said upper, middle, and lower settling plates and said supporting, stabilizing, and space filling tines.

20. The artificial reef of claim 19, wherein each said artificial reef module for coral reef remediation further includes a plurality of secondary tines extending from said supporting tines, said stabilizing tines, and said space filling tines.

21. The artificial reef of claim 20, wherein each said artificial reef module for coral reef remediation further includes tertiary tines extending from said secondary tines.

22. The artificial reef of claim 21, wherein each said artificial reef module for coral reef remediation, further includes quaternary tines extending from said tertiary tines.

23. The artificial reef of claim 22, wherein each said artificial reef module for coral reef remediation is manufactured from a porous ceramic which will slowly dissolve in water allowing said artificial reef to degrade and fragment replicating the fragmentation process of natural branching hard corals.

24. The artificial reef of claim 23, wherein each said central body of each said artificial reef module for coral reef remediation is further formed with a hole through its vertical center.

25. The artificial reef of claim 24, wherein each artificial reef module for coral reef remediation, further includes an anchor inserted through each said hole formed in each said central body.

* * * * *